United States Patent
Shibata et al.

[11] Patent Number: 5,837,887
[45] Date of Patent: Nov. 17, 1998

[54] MISFIRE SENSOR

[75] Inventors: Kazuyoshi Shibata, Nagoya; Yukihisa Takeuchi, Nishikamo, both of Japan; Eric J. Shrader, Belmont; Joseph S. Eckerle, Redwood City, both of Calif.

[73] Assignee: NGK Insulators, Ltd., Japan

[21] Appl. No.: 611,508

[22] Filed: Mar. 6, 1996

Related U.S. Application Data

[63] Continuation of Ser. No. 426,932, Apr. 21, 1995, abandoned, which is a continuation of Ser. No. 221,016, Apr. 1, 1994, abandoned.

[51] Int. Cl.$^6$ .................................................. G01L 23/22
[52] U.S. Cl. ................................................ 73/35.11
[58] Field of Search ........................... 73/35.01, 35.07, 73/35.09, 35.11, 116, 117.3, 593, DIG. 1; 310/317, 319, 329; 701/103

[56] References Cited

U.S. PATENT DOCUMENTS

| | | | |
|---|---|---|---|
| 3,815,411 | 6/1974 | Emerson | 73/117.3 |
| 4,040,294 | 8/1977 | Matsuda et al. | 73/117.3 |
| 4,083,234 | 4/1978 | Aono et al. | 73/116 |
| 4,334,422 | 6/1982 | Kawai et al. | 364/431.08 |
| 4,356,551 | 10/1982 | Iwase et al. | 364/431.08 |
| 4,379,404 | 4/1983 | Hamisch et al. | 73/35 |
| 4,393,688 | 7/1983 | Johnston et al. | 73/35 |
| 4,420,968 | 12/1983 | Dudeck et al. | 73/117.3 |
| 4,446,722 | 5/1984 | Boruschewitz et al. | 73/35 |
| 4,476,711 | 10/1984 | Gutterman | 73/35 |
| 4,492,108 | 1/1985 | van Zanten | 73/116 |
| 4,497,198 | 2/1985 | Takahashi et al. | 73/35 |
| 4,672,839 | 6/1987 | Takeuchi et al. | 73/35 |
| 4,704,894 | 11/1987 | Inuzuka et al. | 73/35 |
| 5,060,615 | 10/1991 | Hashimoto et al. | 73/35 |
| 5,083,278 | 1/1992 | Matsuura | 364/431.08 |
| 5,088,044 | 2/1992 | Matsuura | 364/431.08 |
| 5,115,778 | 5/1992 | Holroyd | 73/35 |
| 5,121,729 | 6/1992 | Hashimoto et al. | 364/431.08 |
| 5,126,615 | 6/1992 | Takeuchi et al. | . |
| 5,210,455 | 5/1993 | Takeuchi et al. | . |
| 5,212,421 | 5/1993 | Hatton et al. | 73/35 |
| 5,281,888 | 1/1994 | Takahashi et al. | . |
| 5,339,245 | 8/1994 | Hirata et al. | 364/431.08 |

*Primary Examiner*—George M. Dombroske
*Assistant Examiner*—Eric S. McCall
*Attorney, Agent, or Firm*—Wall Marjama Bilinski & Burr

[57] ABSTRACT

A sensor element for detecting misfire in an internal combustion engine includes: a detecting unit including a piezoelectric film consisting essentially of a ceramic material, a first electrode coated onto at least a portion of the outer surface of the piezoelectric film, and a second electrode coated onto at least a portion of the inner surface of the piezoelectric film; a vibrating portion consisting essentially of a second ceramic material, the detecting unit being placed on the vibrating portion so that the second electrode is coated onto at least a portion of the vibrating portion; and a fixing portion for fixing the vibrating portion so that the vibrating portion may vibrate. In the misfire sensor, the piezoelectric film converts the sound of a combustion explosion into an electric signal. The misfire sensor is excellent in precise misfire detection and durability at low cost.

6 Claims, 2 Drawing Sheets

MISFIRE SENSOR

This application is a continuation application of U.S. Ser. No. 08/426,932, filed Apr. 21, 1995, abandoned, which in turn is a continuing application of U.S. Ser. No. 08/221,016, filed Apr. 1, 1994, abandoned.

BACKGROUND OF THE INVENTION AND RELATED ART STATEMENT

The present invention relates to a sensor for detecting a misfire in an internal combustion engine of an automobile or the like. The sensor uses a piezoelectric film.

Four-cycle engines, two-cycle engines, diesel engines, and rotary engines are known as internal combustion engines used to power automobiles or the like. These engines produce mechanical energy by the expansion of a combustion gas caused by combustion of a compressed gas mixture. For example, four-cycle engines repeat four steps of intake, compression, combustion, and exhaust. To begin the combustion step, electricity flows into an ignition plug for emitting sparks so that a gas mixture is ignited, then the combustion gas expands to move a piston.

Though the gas mixture generally burns in the combustion step, the gas mixture does not ignite in the combustion step on rare occasions. The misfire sensor aims to detect non-ignition of the gas mixture in the combustion step.

A piston is connected to a crankshaft by a connecting rod. A sensor for detecting a misfire by detecting a change of crankshaft torque is known. However, this sensor cannot detect precisely because the sensor cannot discriminate between two cases, one of which is that the crankshaft torque is changed by an external mechanical vibration and the other of which is that crankshaft torque is changed by a misfire.

In one proposal, combustion conditions are directly detected using the end of an optical fiber inserted into a combustion chamber in the cylinder head. However, its durability is limited because the end becomes covered with soot, or the like, which is generated by combustion. Further, it has another reliability problem because an optical fiber is not durable when exposed to high temperatures. Furthermore, it has the disadvantage that the cylinder head has to be penetrated.

In still another proposal, a sensor detects the condition of combustion by detecting ionic current generated by a combustion gas. However, it has a reliability problem because the ionic current is very week while the engine compartment has high electrical noise. Further, since the ionic current sensor is installed in the cylinder head, there are serious limitations related to its position.

There has been proposed yet another method in which combustion of a gas mixture is detected by a change of pressure in the combustion chamber. However, the choice of materials for the sensor is limited because the pressure and temperature in the combustion chamber becomes high. Further, since the sensor is installed in the cylinder head, there are serious limitations related to its position.

SUMMARY OF THE INVENTION

The present invention solves the aforementioned problems and aims to provide a sensor for detecting a misfire, which has excellent detecting precision and durability at low cost.

The present invention provides a sensor for detecting misfire in an internal combustion engine, including: a detecting unit including a piezoelectric film consisting essentially of the first ceramic material, the first electrode coated onto at least a part of the outer surface of the piezoelectric film, and the second electrode coated onto at least a part of the inner surface of the piezoelectric film; a vibrating portion consisting essentially of the second ceramic material, the detecting unit being placed on the vibrating portion so that the second electrode is coated onto at least a part of the vibrating portion; and a fixing portion for fixing the vibrating portion so that the vibrating portion vibrates; wherein the piezoelectric film converts the sound of a combustion explosion in the internal combustion engine into an electric signal.

The vibrating portion and the fixing portion are portions of a ceramic substrate having a unitary structure, and preferably, the ceramic substrate is formed with a cavity so that the vibrating portion has a relatively thin plate shape.

The first ceramic material preferably contains at least one species selected from the group consisting of lead zirconate, lead magnesium niobate, lead nickel niobate, lead zinc niobate, lead manganese niobate, lead antimony stanate, lead titanate, and barium titanate.

Preferably, the sensor further includes a first lead for transmitting an electric signal from the first electrode and a second lead for transmitting an electric signal from the second electrode.

Preferably, the sensor further includes: an electric insulator formed with a depression corresponding to the detecting unit, the first lead and the second lead penetrating the electric insulator; and a housing containing the detecting unit, the vibrating portion, the fixing portion, the electric insulator, the first lead, and the second lead.

In the sensor of the present invention, a piezoelectric film converts a sound of a combustion explosion in an internal combustion engine into an electric signal. The piezoelectric film is placed between two electrodes. The electrodes output the signal to leads. The sensor outputs periodic electric signals corresponding to combustion events. When a combustion signal is observed at an interval twice as long as the regular interval, it can be understood that one combustion step failed to occur normally.

For example, four-cycle engines repeat the four steps of intake, compression, combustion, and exhaust. Therefore, for example, after a predetermined time passes from the time of ignition, the presence of combustion can be determined by detecting the presence of a combustion-related sound at that time. Recently, the time of igniting an engine is controlled by a computerized control device which uses a microprocessor. Therefore, the sensor of the present invention may be connected to the computerized control device. The expected interval between ignitions and outputs from the sensor may be determined by the microprocessor. Alternatively, the actual elapsed time from the time of ignition to the combustion event may be measured by the microprocessor. Thereby, even in an engine that has a relatively high noise level, the sound of combustion can be effectively detected.

BRIEF DESCRIPTION OF THE DRAWINGS

FIG. 1 (b) is a magnified view of the portion A in FIG. 1 (a).

PREFERRED EMBODIMENTS OF THE INVENTION

Figure 1A:
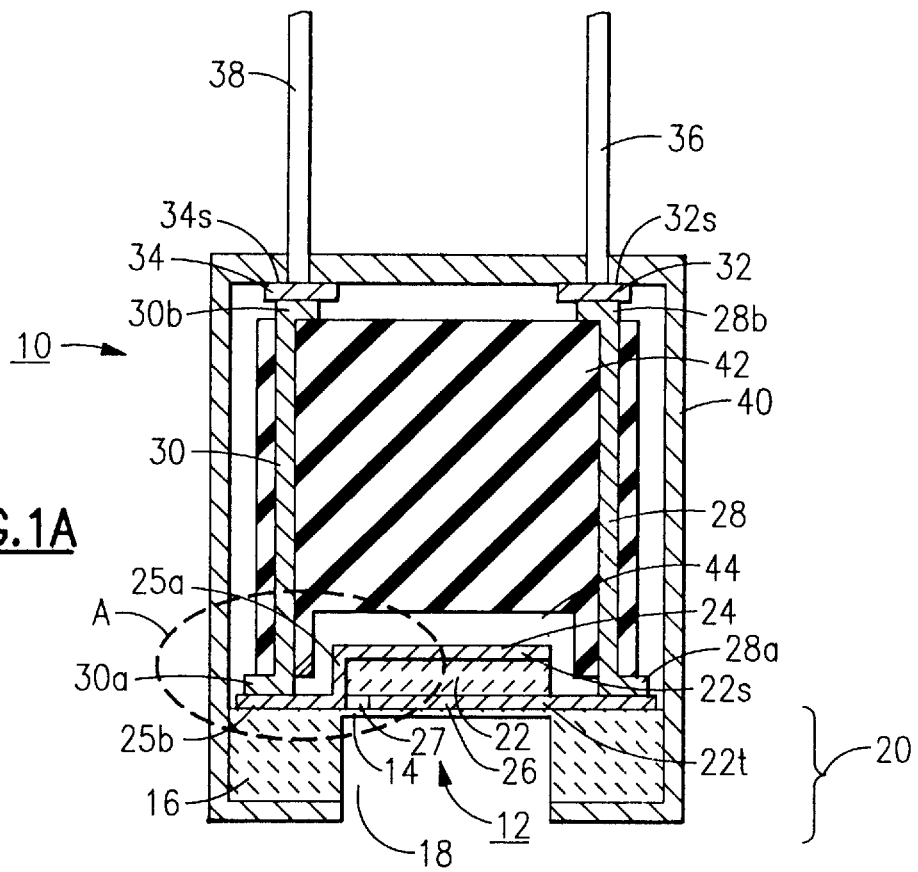
FIG. 1 (a) is a cross-sectional view of an embodiment of a misfire sensor of the present invention.
Figure 1B:
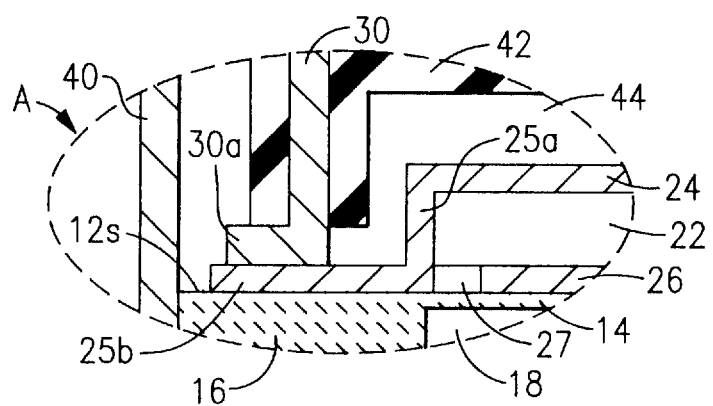

Each of FIG. 1 (a) and FIG. 1 (b) shows a cross-sectional view of a sensor element 10 of the present invention. The sensor element 10 has a substrate 12, a detecting unit 20 placed on a vibrating portion 14, an insulator 42, and a housing 40 which contains the substrate 12, the detecting unit 20, and the insulator 42.

The substrate 12 has a unitary structure. The vibrating portion 14 and the fixing portion 16 are portions of the substrate 12. The detecting unit 20 is placed on the upper side of the portion 14. The fixing portion 16 is positioned at the lower side of the vibrating portion 14 so as to surround the vibrating portion 14.

However, it is not necessary in the present invention that the vibrating portion and the fixing portion are portions of the substrate. For example, a metal fixing portion may fix a vibrating portion made of ceramic. When the fixing portion is made of metal, the surface of a vibrating portion to be connected to the fixing portion may be metalized so that the metalized layer may be fixed to the fixing portion by soldering. Alternatively, the vibrating portion may be fixed to the fixing portion without metalization by use of a mounting structure which presses it against the fixing portion. A metal such as stainless steel or iron may be used for the fixing portion. The fixing portion may be a portion of the housing.

In the present invention, it is not necessary that all the circumference of the vibrating portion be supported by the fixing portion as shown in FIG. 1 (a) and FIG. 1 (b). It is also possible that at least a part of the vibrating portion or at least a part of the circumference of the vibrating portion may be supported by the fixing portion.

The substrate 12 is formed with a cavity 18 so that the vibrating portion 14 has the shape of a thin plate or diaphragm. The detecting unit 20 is placed so as to correspond to the position of the cavity 18. However, the cavity of present invention is not limited to be a depression and may be, for example, a closed space inside the substrate 12.

The vibrating portion 14 vibrates with the detecting unit 20 vertically, i.e., in the direction toward the detecting unit 20 or toward the cavity 18. Preferably, the vibrating portion 14 has a plate shape because this shape is suitable for vibration. The thickness of the plate is preferably 1–100 $\mu$m, more preferably, 3–50 $\mu$m, furthermore preferably, 5–20 $\mu$m.

The vibrating portion 14 is preferably made of a material having good resistance to high temperatures so as to prevent thermal degradation of the vibrating portion. It should permit the piezoelectric film 22 to be placed directly on the vibrating portion 14 without any material, such as an organic adhesive (that has poor high temperature resistance) therebetween.

The vibrating portion 14 is preferably made of an electrical insulator because the second electrode covering at least a part of the vibrating portion 14, leads connected to the first electrode and the second electrode, lead terminals, and the like are all electrically conductive. Therefore, the vibrating portion 14 may be made of a metal having good high-temperature properties, which is covered with a ceramic such as glass. Most preferably, the vibrating portion 14 is made of ceramic. For example, stabilized zirconium oxide, aluminum oxide, magnesium oxide, mullite, aluminum nitride, silicon nitride, glass, or the like can be suitably used for the vibrating portion. Zirconium oxide that is stabilized is especially preferable because it has high mechanical strength and high tenacity even if the vibrating portion is thin, and it also has low chemical reactivity with the piezoelectric film and electrodes.

Zirconium oxide that is stabilized includes stabilized zirconia and partially stabilized zirconia. Zirconium oxide that is stabilized does not undergo a phase transition since it has a crystal structure such as the cubic system. On the other hand, zirconium oxide undergoes a phase change between a monoclinic structure and a tetragonal structure at around 1000° C. This phase change may generate cracks. Zirconium oxide that is stabilized contains 1–30% by mole of calcium oxide, magnesium oxide, yttrium oxide, scandium oxide, ytterbium oxide, cerium oxide, or a stabilizer such as a rare earth metal oxide. Preferably, the stabilizer contains yttrium oxide so as to enhance mechanical strength of the vibrating portion. The amount of yttrium oxide contained in the stabilizer ranges preferably from 1.5 to 6% by mole, more preferably from 2 to 4% by mole. Further, the main crystalline phase may belong to the tetragonal system or a mixture of the tetragonal system and the cubic system.

The ceramic composing the vibrating portion 14 preferably contains 0.5–5% by weight of silicon oxide, more preferably 1–3% by weight, because silicon oxide prevents an excessive reaction between the vibrating portion 14 and the detecting unit 20 upon forming the detecting unit 20 by thermal treatment and gives excellent piezoelectric properties.

When the vibrating portion 14 consists of ceramic, it is composed of numerous grains. The average diameter of the grains ranges preferably from 0.05 to 2 $\mu$m, more preferably from 0.1 to 1 $\mu$m.

At least part of the circumference of the vibrating portion 14 is fixed to the fixing portion 16 so that the vibrating portion 14 can vibrate. In the embodiment of FIG. 1 (a) and FIG. 1 (b), the fixing portion 16 preferably consists of a ceramic. The ceramic material for the fixing portion 16 may be the same as that of the vibrating portion 14, or may be different from that of the vibrating portion. Stabilized zirconium oxide, aluminum oxide, magnesium oxide, mullite, aluminum nitride, silicon nitride, glass, or the like, is suitable material for the fixing portion 16 as well as for the vibrating portion 14.

The shape of cavity 18 is not limited. A shape of the horizontal or vertical cross section of the cavity may be, for example, a circle, an oval, a polygon including a square and a rectangle, or a complex shape or combination thereof. However, when the shape is a polygon or the like, the corners are preferably rounded so as to remove the sharp edges.

The cavity 18 is preferably equipped with a horn to enhance collection of sound. Further, it is preferable that the housing 40 be formed with an opening corresponding to the depression 18 so that the sound of a combustion explosion is transmitted to the vibrating portion 14 and the detecting unit 20.

The detecting unit 20 includes a piezoelectric film 22, a first electrode 24 covering at least a part of the outer surface 22s of the piezoelectric film 22, and the second electrode 26 covering at least a part of the inner surface 22t of the piezoelectric film. The second electrode 26 covers at least a part of the surface of the vibrating portion 14.

The piezoelectric film 22 microscopically generates dielectric polarization corresponding to stress. The piezoelectric film 22 macroscopically outputs an electric signal, for example, electric charge or voltage, corresponding to stress. The piezoelectric film preferably exhibits flexing displacement in the direction of the thickness when the vibrating portion 14 vibrates. When a combustion sound causes vibration of the vibration portion 14, the piezoelectric film 22 vibrates with the vibrating portion 14. This vibration gives rise to stresses in the piezoelectric film 22.

The piezoelectric film preferably has a thickness of 1–100 μm, more preferably 5–50 μm, furthermore preferably 5–30 μm.

A piezoelectric ceramic can be suitably used for the piezoelectric film. The piezoelectric film may be a ceramic having electrostriction or a ceramic having ferroelectricity. Further, the piezoelectric film may be made of a material that recuires a treatment for polarization or a material that does not require a treatment for polarization.

The ceramic for a piezoelectric film may contain, for example, lead zirconate, lead magnesium niobate, lead nickel niobate, lead zinc niobate, lead manganese niobate, lead antimony stanate, lead titanate, barium titanate, or a combination thereof. The ceramic may contain not less than 50% by weight of a compound consisting of these as a main component. A ceramic containing lead zirconate can be preferably used. Further, the aforementioned ceramic may further include oxides of lanthanum, calcium, strontium, molybdenum, tungsten, barium, niobium, zinc, nickel, manganese, or the like; a combination thereof; or other compounds. For example, it is preferable to use ceramic containing a component consisting of lead magnesium niobate, lead zirconate, and lead titanate as a main component, and further containing lanthanum and strontium.

The piezoelectric film may be dense or it may be porous. A porous piezoelectric film preferably has a porosity of not more than 40%.

The piezoelectric film may have one layer or may be a laminated structure having at least two layers. When the piezoelectric film has the laminated structure, each of the layers may be placed horizontally or vertically.

It is also possible to place a detecting unit not only on one side of the vibrating portion but also on both sides of the vibrating portion.

In FIG. 1 (a) and FIG. 1 (b), the first electrode 24 and the second electrode 26 output an electric signal from the piezoelectric film 22 by means of a lead 28 and a lead 30 to a connector 32 and a connector 34. The first electrode 24 is connected to a lead 30 by a connecting portion 25a, which covers a part of a side of the piezoelectric film 22, and a connecting portion 25b, which covers a part of the surface 12s of the substrate 12. A gap 27 is formed between the connection portion 25b and the second electrode 26 on the surface 12s of the substrate 12. The second electrode 26 and the connecting portion 25b may be formed simultaneously by a method for forming a thin film, which will be described later.

Each of the first electrode and the second electrode has a suitable thickness depending on its use. However, it is preferably 0.1–50 μm.

The first electrode is made of an electrically conductive metal, which is solid at room temperature. For example, metals such as aluminum, titanium, chromium, iron, cobalt, nickel, copper, zinc, niobium, molybdenum, ruthenium, rhodium, silver, tin, tantalum, tungsten, iridium, platinum, gold, lead, or the like; or an alloy thereof may be used. Needless to say, the first electrode may contain these elements in any combination. A metal belonging to the platinum group such as platinum, rhodium, palladium, or an alloy containing these metals, such as silver-platinum or platinum-palladium is suitably used for the main component of the material for the electrode. Copper, silver, and gold are more preferable because they have durability.

The second electrode preferably consists of a simple substance containing a metal having a high melting point, such as platinum, ruthenium, rhodium, palladium, iridium, titanium, chromium, molybdenum, tantalum, tungsten, nickel, cobalt; or an alloy thereof. Needless to say, the second electrode may contain these metals, each having a high melting point, in any combination. A metal belonging to the platinum group such as platinum, rhodium, palladium, or an alloy containing these metals, such as silver-platinum or platinum-palladium is suitably used for the main component of the material for the electrode. A metal resistant to an oxidizing atmosphere at high temperatures is preferably used for the second electrode because the second electrode is sometimes exposed to high temperature during thermal treatment for the piezoelectric film.

A material suitably used for the second electrode may be a cermet containing a metal having a high melting point and a ceramic such as alumina, zirconium oxide, silicon oxide, or glass.

It is preferable that the connecting portion 25b be made of the same material as that of the second electrode 26 because the connecting portion 25b covers the surface 12s of the substrate 12 in the same manner as the second electrode. The connecting portion 25a is preferably made of the same material as that of the first electrode. However, when the connecting portion 25a is made of one of the materials for the first electrode described above, the material of the connecting portion 25a is not required to be the same as that of the first electrode.

The shape of the ceramic substrate is not especially limited and may be selected depending on the application. The shape of the ceramic substrate is preferably planar. However, it may be cylindrical or tubular. In addition, a ceramic substrate may have a closed cavity instead of a depression.

The insulator 42 is formed with a depression 44 corresponding to the protrusion of the detecting unit 20 out of the substrate 12 thereby providing space between the detecting unit 20 and the insulator 42. Consequently, the detecting unit 20 can move in the direction of its thickness. Therefore, the shape of the depression 44 is not limited as long as the detecting unit 20 can move in the direction of its thickness, and the depression may not be required.

A cross-sectional shape of the insulator 42 may correspond to the cross-sectional shape of the substrate. For example, if the substrate has a cross-sectional shape of a circle when viewed in the direction 46, then the insulator 42 may be a cylindrical shape having its axis in direction 46. In this case, the detecting unit 20 may have a cylindrical shape having a common axis with the substrate, and the depression 44 may be cylindrical, having the same axis. Needless to say, the shape of these portions is merely an example, and the shape of each portion is not limited to these examples.

The insulator preferably uses ceramic, for example, steatite, forsterite, mullite, or the like. The insulator may use a known material generally used for an insulator. The insulator may use a plastic having good resistance to high temperatures.

A lead 28 and a lead 30 pass through the insulator 42 preferably on the outer side (in the radial direction) of the depression 44. The lead 28 and the lead 30 may each be, for example, a metal plate or a metal bar. The lead 28 and the lead 30 are bent so as to form the end portions 28a and 30a, respectively. The end portion 28a is placed between the insulator 42 and the second electrode 26 so as to ensure the electrical connection of the end portion 28a to the second electrode 26. At the same time, the end portion 30a is placed between the insulator 42 and the connecting portion 25b so as to ensure the electrical connection of the end portion 30a to the connecting portion 25b.

Preferably, the end portion 28a, the end portion 30a, the second electrode 26, and the connecting portion 25b do not make contact with the housing 40 directly so as not to provided an electrical path between the two electrodes when housing 40 is made of metal. In FIG. 1 (a) and FIG. 1 (b), the end portions 28a and 30a are bent outward (in the radial direction). They may alternatively be bent inward.

The other end portion 28b of the lead 28 and the other end portion 30b of the lead 30 are also bent. The end portion 28b is placed between the insulator 42 and the connector 32 so as to ensure the electrical connection of the end portion 28b to the connector 32. At the same time, the end portion 30b is placed between the insulator 42 and the connector 34 so as to ensure the electrical connection of the end portion 30b to the connecter 34. Preferably, an annular area on the surface 32s of the connector 32 and a similar area on surface 34s of the connector 34 is covered with an electrically insulating ceramic. Alternatively, each surface is mounted on the housing 40 by means of an electric insulator so as not to form a short circuit with the housing 40. The connector 32 is connected with a lead 36 penetrating the housing 40, and in the same manner, the connector 34 is connected with a lead 38 penetrating the housing 40. Each of the leads 36 and 38 is, for example, a metal wire covered with an electrically insulating plastic.

In FIG. 1 (a) and FIG. 1 (b), the first electrode 24 and the lead 30 are electrically connected with the connecting portions 25a and 25b and the lead terminal 30a. It is also possible that the substrate 12 has an electrode terminal like the connecting portion 25b on the surface 12s and that the electric connection is made by wire bonding, soldering, mechanically connected or crimped metal wire, or the like. The electric connection of the electrode terminal to the lead end 28a may be made in the same manner. Alternatively, the first electrode 24 may be electrically connected to the lead end 30a directly by wire bonding, or the like, without any connecting portion.

A method for manufacturing a sensor element consisting of the substrate 12 and the detecting unit 20 is hereinafter described.

Molded layers of green sheet or green tape may be laminated by thermally pressing and then sintered to obtain an integrated substrate. For example, the substrate 12 of FIG. 1 (a) and FIG. 1 (b) may be made by laminating two layers of green sheets or green tapes. The molded layers may be formed by press molding, slip casting, injection molding, or the like. The cavity may be formed by machining such as cutting, laser machining, blanking by press working, or the like. It is not required that the layers have the same thickness. However, it is preferable that each of the molded layers have the same degree of shrinkage due to sintering.

When the cavity is a depression, green sheets or green tapes may be molded so as to have a shape corresponding to the depression before sintering. Alternatively, the cavity may be formed by machining after sintering.

A method to form the detecting unit 20 on a ceramic vibrating portion 14 is described as follows. A piezoelectric body is formed by press molding using a mold, tape forming using a slurry, or the like. The green piezoelectric body is laminated onto the vibrating potion of the green substrate by thermal pressing and is then sintered so as to form a substrate and a piezoelectric body that are bonded together. This method requires that the electrodes be formed in advance on the substrate or the piezoelectric body by one of the methods for forming a film described later.

Though a sintering temperature of a piezoelectric film is suitably determined depending on the materials which compose the film, it is generally 800° C.–1400° C, preferably 1000° C.–1400° C. It is preferable that the piezoelectric film be sintered together with an evaporating source of the piezoelectric film material so as to control the composition of the piezoelectric film.

On the other hand, in a method for forming a film, the second electrode 26, the piezoelectric film 22, and the first electrode 24 are laminated on the vibrating portion 14 in this order to form the detecting unit 20. A method for forming a film in conventional art, for example, a method for forming a thick film such as screen printing, an applying method such as dipping, a method for forming a thin film such as ion beam, sputtering, vacuum deposition, ion plating, chemical vapor deposition (CVD), or plating may be used. However, a method for forming a film is not limited to these methods. The second electrode 26 and the connecting portion 25b are simultaneously applied to the substrate by screen printing. Preferably, the piezoelectric film 22 is formed by a method for forming a thick film, such as screen printing or the like. These methods use a paste or a slurry containing ceramic powders of the piezoelectric film material as a main component. Therefore, the piezoelectric film 22 is formed on the substrate having excellent piezoelectric properties. Forming a piezoelectric film by one of these methods for forming films does not require any adhesive, and a detecting unit can be integrally connected with a vibrating portion. Therefore, such a method is particularly preferable in view of its excellent reliability, excellent reproducibility, and easy integration. The shape of such a film may be suitably patterned. A pattern may be formed by a method such as screen printing or photolithography or by removing unnecessary parts by machining such as laser machining, slicing, or ultrasonication.

The shapes for the piezoelectric film, the first electrode, and the second electrode are not limited at all and any shape may be employed. For example, they may be a polygon such as a triangle and a square, a curved shape such as a circle, an oval, and a torus, a comblike shape, a lattice, or a combination of these to form a special shape.

Each of the films 22, 24, 26, which are thus formed on a substrate, may be subjected to thermal treatment immediately after the film is formed, so that the film and substrate are integrated. Alternatively, after all the films are formed, the films may be subjected to thermal treatment simultaneously so as to integrally connect the films to the substrate. When the first electrode or the second electrode is formed by a method for forming a thin film, thermal treatment is not always necessary to integrate these electrodes.

Further, in order to form these films and the substrate integrally, they may be subjected to thermal treatment at generally 800° C.–1400° C., preferably 1000° C.–1400° C. When a piezoelectric film is subjected to thermal treatment, the thermal treatment is preferably performed in the presence of a vapor source of the piezoelectric film material. Without the vapor source, the composition of the piezoelectric film could be unstable.

The misfire sensor of the present invention must have at least one detecting unit on one vibrating portion. However, at least two detecting units may be placed on the vibrating portion. In the latter case, at least two vibrating portions are preferably provided so that the vibration of each detecting unit is independent. The structure of each of the detecting units may be the same or different. When more than one detecting unit have the same structure, the output signal can be increased while ensuring the reliability of the vibrating portion. On the other hand, when more than one unit with different structures are used, frequency components can be detected separately.

The method for using a misfire sensor of the present invention is hereinbelow explained.

A misfire sensor can be attached to any place on an engine on as long as the sensor can detect the sound of a combustion explosion. For example, the sensor may be attached to any part of a cylinder block, an exhaust pipe, an intake manifold, or the like. Among these, it is preferable that the misfire sensor be attached to the outer wall of a cylinder block or that the misfire sensor be attached to the outer wall of the cylinder head. The sensor detects the sound of combustion explosions since the combustion chamber is disposed inside the cylinder head. It is preferable to avoid mounting the sensor directly facing a combustion chamber in view of engine efficiency, durability of the sensor, the seal between the sensor and the cylinder head, etc. Therefore, the sensor is preferably mounted on the outer wall of the cylinder head. When sensors are mounted on a cylinder block, each sensor is preferably attached to the outer wall corresponding to each cylinder.

Figure 2:
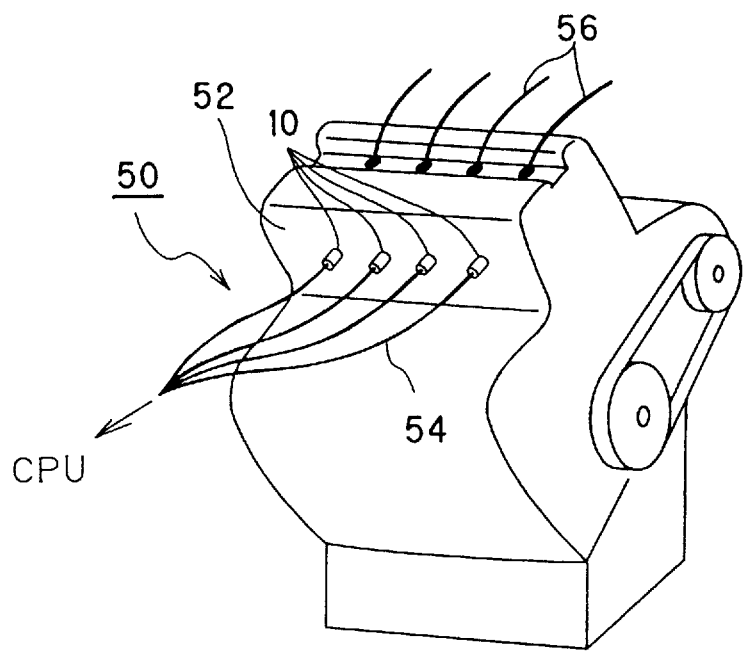
FIG. 2 is a perspective view showing positions to which misfire sensors of the present invention are fixed on an engine.

FIG. 2 shows four sensors 10 fixed on the outer wall of a cylinder head 52 of an engine 50. Since this engine has four cylinders, one misfire sensor is mounted near each of the four cylinders. Lead wires 54 extend from each of the sensors 10 to a central processing unit. Lines 56 are connected to an ignition apparatus. In FIG. 2, each of the four cylinders are equipped with a sensor. However, only one sensor might be used to detect misfire in a plurality of cylinders.

When the misfire sensor is mounted on an exhaust pipe or an intake manifold, the sensor can detect a sound related to each combustion explosion caused by hot gas, which leaks out of a clearance between each valve and the associated valve seat.

When misfire sensors are mounted on a cylinder block or an intake manifold, special cooling means are not required because the sensors are not exposed to heat. However, misfire sensors mounted on an exhaust pipe are preferably cooled. For example, the sensor may be cooled by the engine cooling. Alternatively, the sensor may be cooled by a fin or fins for radiating heat.

A misfire sensor of the present invention does not require an adhesive for connecting the detecting unit and the vibrating portion because the detecting unit is fabricated directly on the vibrating portion. The sensor can be therefore operated at high temperatures. The misfire sensor possesses high durability because an adhesive is not subjected to attack by vibrations, heat, a lubricant, or the like. Unlike a conventional misfire sensor which detects a signal based on a vibration, the misfire sensor of the present invention detects the sound of an combustion explosion, thereby improving its response and sensitivity. Further, the sensitivity is enhanced by the piezoelectric film having good high frequency response. Furthermore, the cost of the misfire sensor of the present invention is low because the method for producing the sensor is simple.

Though the present invention has been described specifically on the basis of some embodiments, the present invention should not be limited to the embodiments described above. It should be understood that various alterations, modifications, improvements, or the like can be made based on the knowledge of a person having ordinary skill in the art without deviating from the teachings of the present invention.

What is claimed is:

1. A sensor for detecting misfire in an internal combustion engine, comprising:

a detecting unit including a piezoelectric film consisting essentially of a first ceramic material, a first electrode coated onto at least a portion of an outer surface of said piezoelectric film, and a second electrode coated onto at least a portion of an inner surface of said piezoelectric film;

a substrate having a top surface, a bottom surface, and a cavity formed through the bottom surface and into the substrate thereby providing a relatively thin vibrating portion supported by a relatively thick fixing portion such that said vibrating portion is adapted to vibrate with respect to said fixing portion, said vibrating portion consisting essentially of a second ceramic material and supporting said detecting unit such that said second electrode is coated onto said vibrating portion, wherein said cavity is open externally to said sensor to receive a sound generated by combustion explosion from an internal combustion engine;

first and second leads respectively electrically connected to said first and second electrodes;

an electric insulator having a depression complementary in shape to said detecting unit, said first and second leads extending through said electric insulator and being electrically connected to said first and second electrodes, respectively; and a housing containing said detecting unit, said substrate, said electrical insulator, and said first and second leads;

wherein said piezoelectric film converts such a sound generated by combustion explosion in an internal combustion engine into an electrical signal.

2. A sensor of claim 1, wherein said substrate has a unitary structure comprised of said second ceramic material such that said vibrating portion and said fixing portion are integrally formed together.

3. A sensor of claim 1, wherein said first ceramic material comprises at least one species selected from a group consisting of lead zirconate, lead magnesium niobate, lead nickel niobate, lead zinc niobate, lead manganese niobate, lead antimony stanate, lead titanate, and barium titanate.

4. A method for detecting misfire in an internal combustion engine, comprising the steps of:

providing a detecting unit including a piezoelectric film consisting essentially of a first ceramic material, a first electrode coated onto at least a portion of an outer surface of said piezoelectric film, and a second electrode coated onto at least a portion of an inner surface of said piezoelectric film; and a substrate having a top surface, a bottom surface, and a cavity formed through the bottom surface and into the substrate thereby providing a relatively thin vibrating portion supported by a relatively thick fixing portion such that said vibrating portion is adapted to vibrate with respect to said fixing portion, said vibrating portion consisting essentially of a second ceramic material and supporting said detecting unit such that said second electrode is coated onto said vibrating portion, wherein said cavity is open externally to said sensor to receive a sound generated by combustion explosion from an internal combustion engine;

receiving a sound generated by combustion explosion from an internal combustion engine thereby vibrating the vibrating portion and the detecting unit;

converting vibrations of the detecting unit into an electrical signal by the piezoelectric film; and sending the electrical signal through said first electrode and said second electrode.

5. The method of claim 4, further comprising:

providing first and second leads respectively electrically connected to said first and second electrodes; an electric insulator having a depression complementary in shape to said detecting unit, said first and second leads extending through said electric insulator and being electrically connected to said first and second electrodes, respectively; and a housing containing said detecting unit, said substrate, said electrical insulator, and said first and second leads.

6. The method of claim 4, wherein said substrate has a unitary structure comprised of said second ceramic material such that said vibrating portion and said fixing portion are integrally formed together.

* * * * *

UNITED STATES PATENT AND TRADEMARK OFFICE
CERTIFICATE OF CORRECTION

PATENT NO. : 5,837,887
DATED : November 17, 1998
INVENTOR(S) : Kazuyoshi Shibata, Yukihisa Takeuchi, Eric J. Shrader and Joseph S. Eckerle It is certified that error appears in the above-indentified patent and that said Letters Patent is hereby corrected as shown below:

Column 10, line 65, "sensor" should read --detecting unit--.

Signed and Sealed this

Twenty-third Day of November, 1999

Attest:

Q. TODD DICKINSON

*Attesting Officer*     *Acting Commissioner of Patents and Trademarks*